(12) United States Patent
Medina Diaz et al.

(10) Patent No.: US 12,163,505 B2
(45) Date of Patent: Dec. 10, 2024

(54) PITCH SYSTEMS FOR BLADES OF WIND TURBINES AND ASSOCIATED METHODS

(71) Applicant: General Electric Renovables Espana, S.L., Barcelona (ES)

(72) Inventors: Alio Medina Diaz, Barcelona (ES); Josep Bosch Collado, Barcelona (ES); Javier Bescos Grillo, Barcelona (ES); Pedro Palomares Rentero, Barcelona (ES); Ignasi Vega Boada, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/436,106

(22) Filed: Feb. 8, 2024

(65) Prior Publication Data

US 2024/0271598 A1 Aug. 15, 2024

(30) Foreign Application Priority Data

Feb. 9, 2023 (EP) ..................................... 23382118

(51) Int. Cl.
*F03D 7/02* (2006.01)

(52) U.S. Cl.
CPC .......... *F03D 7/0248* (2013.01); *F03D 7/0224* (2013.01); *F05B 2260/4031* (2013.01); *F05B 2260/902* (2013.01)

(58) Field of Classification Search
CPC .... F03D 7/0224; F03D 7/0248; F03D 17/029; F03D 1/0664; F03D 80/701;
(Continued)

(56) References Cited

U.S. PATENT DOCUMENTS

| | | |
|---|---|---|
| 6,939,103 B2 | 9/2005 | Wobben |
| 7,866,946 B2 | 1/2011 | Nitzpon |

(Continued)

FOREIGN PATENT DOCUMENTS

| | | |
|---|---|---|
| CN | 215719220 U | 2/2022 |
| CN | 114876728 A | 8/2022 |

(Continued)

OTHER PUBLICATIONS

Copy of European Search Report Corresponding to EP23382118 on 26JUN2023.

*Primary Examiner* — Elton K Wong
(74) *Attorney, Agent, or Firm* — Dority & Manning, P.A.

(57) ABSTRACT

The present disclosure is related to pitch systems for blades of wind turbines. The pitch system comprises a pitch bearing having a first bearing ring connected to a hub of the wind turbine, and a second bearing ring connected to a blade. The pitch system also includes an annular gear and a pitch drive having a motor, a gearbox, a main brake, and a pinion. In addition, the pitch system includes an auxiliary brake system comprising an auxiliary brake and an auxiliary pinion to engage with the annular gear, where the auxiliary brake is configured to switch between an active state, wherein braking forces are applied to the annular gear to maintain the blade in an instantaneous position, and an inactive state. The present disclosure further relates to wind turbines comprising such pitch systems and methods for applying an emergency pitch braking torque to a pitch system.

12 Claims, 3 Drawing Sheets

(58) Field of Classification Search
CPC ........ F05B 2260/4031; F05B 2260/845; F05B 2260/902; F05B 2270/328
See application file for complete search history.

(56) References Cited

U.S. PATENT DOCUMENTS

| | | |
|---|---|---|
| 8,092,171 B2 | 1/2012 | Wiebrock et al. |
| 8,172,532 B2 | 5/2012 | Wolf |
| 8,177,510 B2 | 5/2012 | Nies et al. |
| 2006/0083615 A1 | 4/2006 | Rogall et al. |
| 2011/0211961 A1* | 9/2011 | Nies ........................ F03D 80/00 416/169 R |
| 2012/0251320 A1 | 10/2012 | Ko et al. |
| 2016/0245257 A1 | 8/2016 | Jensen |
| 2022/0003208 A1 | 1/2022 | Hor et al. |

FOREIGN PATENT DOCUMENTS

| | | |
|---|---|---|
| EP | 2495435 A1 | 9/2012 |
| EP | 2518305 A2 | 10/2012 |
| EP | 2472104 B1 | 4/2019 |
| WO | WO2008/074320 A1 | 6/2008 |

* cited by examiner

PITCH SYSTEMS FOR BLADES OF WIND TURBINES AND ASSOCIATED METHODS

FIELD

The present disclosure relates to pitch systems for blades of wind turbines and methods for applying a braking torque to such systems. More particularly, the present disclosure relates to methods and systems which can avoid a loose blade in case of a failure in a pitch system.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted through a rotor shaft to a generator, either directly ("directly driven" or "gearless") or through the use of a gearbox. This way, the generator produces electricity which can be supplied to the electrical grid.

Wind turbines have evolved rapidly over the last decades with a clear trend of increasing size. The power generated by a wind turbine is proportional to the rotor swept area and, therefore to the square of the blade length. Thus, higher towers and longer blades have been used with the goal of extracting more energy from the wind, leading to a higher electricity production. The increase in size over the years has led to a substantial increase in the loads acting on wind turbine components, and has posed new challenges for a wide range of disciplines including mechanical, electrical, materials and civil engineering among others.

Pitch systems are employed for adapting the position of a wind turbine blade to adapt to varying wind conditions. In this respect, it is known to rotate a wind turbine blade in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

Pitch systems may comprise an electric or hydraulic motor which, through the use of reduction gearing (sometimes referred to as a "reductor", or as a "reduction drive"), drives an actuating gear. Said actuating gear, usually a pinion, meshes with an annular gear provided on the wind turbine blade to set the wind turbine blade into rotation. Other actuating mechanisms operated by a pitch motor are however also known.

It is further known to provide an individual pitch system comprising a separate motor and separate control for each wind turbine blade of a rotor. It is also known to provide a common pitch system wherein the pitch angle of the blades is the same for all blades on a rotor. Such a common pitch system may comprise a single motor or may comprise a plurality of motors, one for each blade.

During operation, the wind turbine blades are subjected to multiple loads, and a good functioning of the pitch system is essential for avoiding an overload condition of the blade which might end up leading to a wind turbine failure.

Different solutions have been proposed in order to enhance the performance of pitch systems and overcome possible pitch system failures.

It has been found that a particularly critical load case occurs when the wind turbine is in a shutdown procedure, and one of the pitch system fails. I.e., this would create a situation in which two blades are being pitched towards a feathered position, whereas the third blade is loose. In particular, it has been found that a situation in which the third blade is loose can be more critical than a situation in which the third blade is stuck in a specific pitch position, even a position in which lift is maximum or close to maximum.

The present disclosure provides methods and devices to at least partially overcome some of the aforementioned drawbacks.

SUMMARY

In an aspect of the present disclosure, a pitch system for a blade of a wind turbine is provided. The pitch system comprises a pitch bearing having a first bearing ring connected to a hub of the wind turbine, and a second bearing ring connected to the blade, wherein the first bearing ring is rotatable with respect to the second bearing ring. The pitch system also includes an annular gear. The system furthermore includes a pitch drive having a motor, a gearbox, a main brake, and a pinion to engage with the annular gear. In addition, the pitch system includes an auxiliary brake system having an auxiliary brake and an auxiliary pinion which engages with the annular gear. The auxiliary brake is configured to switch between an active state and an inactive state. In the active state, braking forces are applied to the annular gear to maintain the blade in an instantaneous position, and in an inactive state substantially no braking forces are applied to the annular gear. A default state of the auxiliary brake is the inactive state.

According to this aspect, in normal operation the auxiliary brake of the pitch system is in an inactive state i.e no braking forces are applied by the auxiliary brake to the annular gear, and engagement of the annular gear and corresponding pitch position(s) are only determined by the pitch drive. Switching the auxiliary brake from an inactive state to an active state may provide an extra braking force to the annular gear and thereby reduces the chances of having a blade of a wind turbine moving uncontrolled relative to the hub e.g. blade free condition. Thus, the auxiliary brake may serve as a backup brake.

The instantaneous position of the blade may herein be understood as the position of the corresponding blade when the auxiliary brake is activated. At the moment that a fault is detected that requires operation of the auxiliary brake, the auxiliary brake aims to block further movement of the blade as soon as possible.

In a further aspect, a method for applying an emergency pitch braking torque to a pitch system of a blade of a wind turbine is provided. The method comprises detecting a fault in a pitch drive of the pitch system, wherein the pitch drive includes a motor, a gearbox, a main brake and a pinion engaged with an annular gear of the pitch system. The method further comprises switching an auxiliary brake from an inactive state to an active state when the fault is detected, wherein in the active state, the auxiliary brake blocks an auxiliary pinion engaged with the annular gear in order to apply braking forces to the annular gear and maintain the blade in an instantaneous position.

The method provides a reliable and effective way of applying an emergency pitch braking torque to a pitch system, preventing a condition of uncontrolled movement of a blade relative to a hub of a wind turbine.

In yet a further aspect, a wind turbine comprising a pitch system for a blade of the wind turbine is provided. The pitch system comprises a pitch bearing having a first bearing ring connected to a hub of the wind turbine, and a second bearing ring connected to the blade, where the first bearing ring is rotatable with respect to the second bearing ring. The pitch system also includes an annular gear. The system furthermore includes a pitch drive having a motor, a gearbox, a main brake, and a pinion to engage with the annular gear. In addition, the pitch system includes an auxiliary brake having an auxiliary pinion to engage with the annular gear, wherein the auxiliary brake is configured to switch between an active state, wherein braking forces are applied to the auxiliary pinion to block the blade in an instantaneous position, and an inactive state wherein no braking forces are applied to the auxiliary pinion, and wherein a default state of the auxiliary brake is the inactive state.

Additional objects, advantages and features of embodiments of the present disclosure will become apparent to those skilled in the art upon examination of the description, or may be learned by practice.

DETAILED DESCRIPTION OF EXAMPLES

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
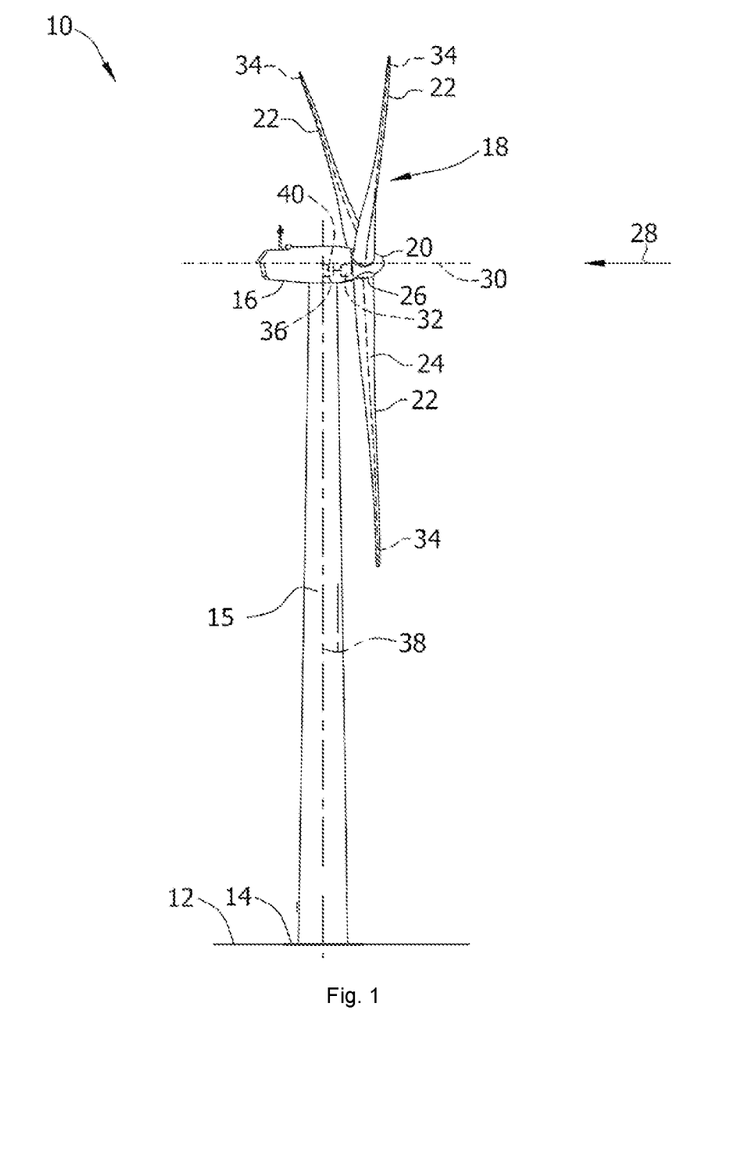
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
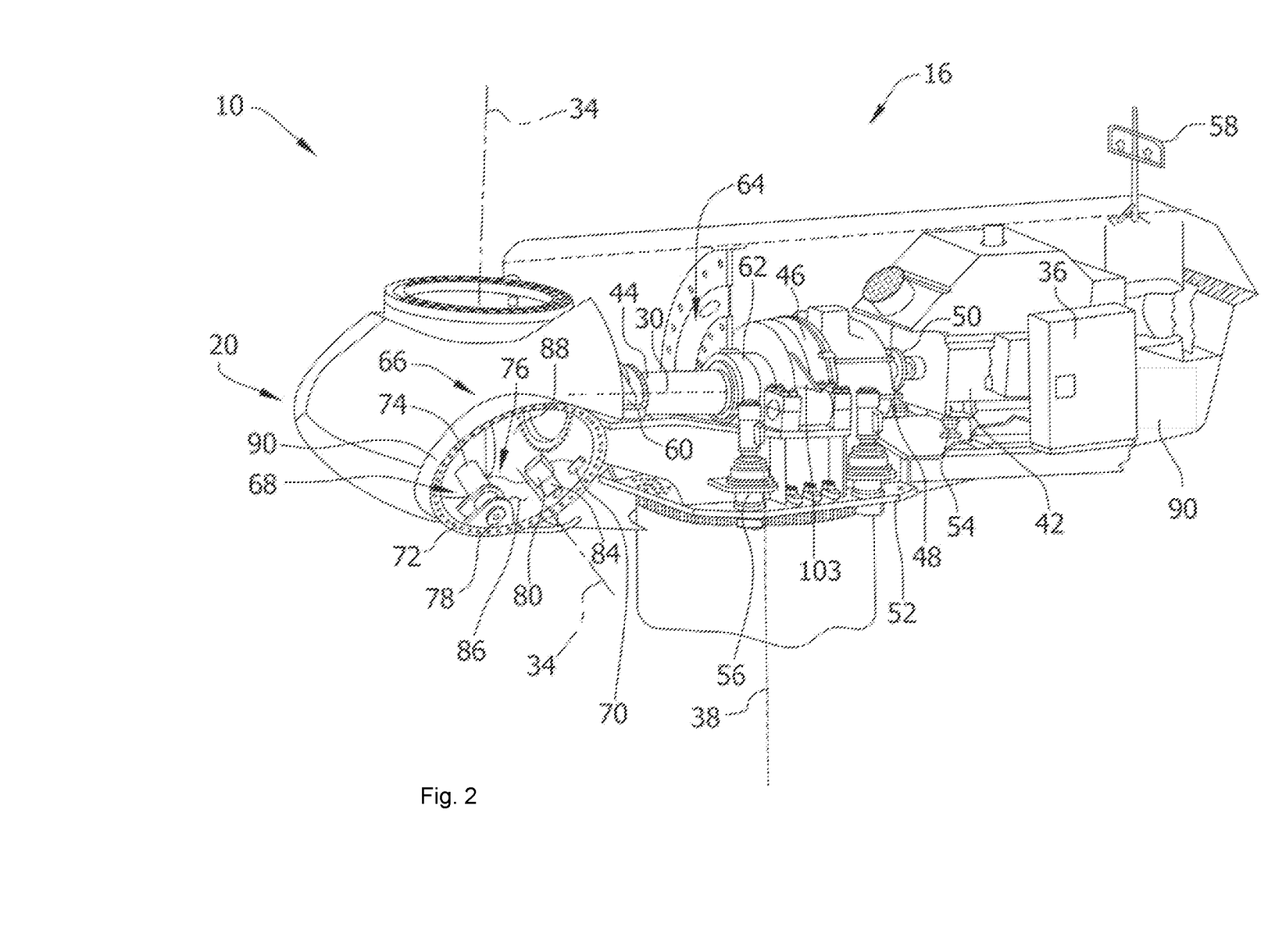
FIG. 2 illustrates an example if a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage, e.g. 10-35 KV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, main frame 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
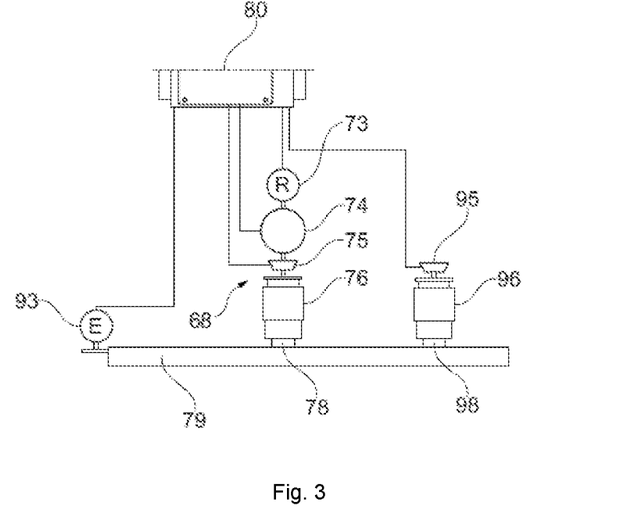
FIG. 3 schematically illustrates an example of a pitch system according to the present disclosure.

FIG. 3 schematically illustrates an example of a pitch system 32 for a blade of a wind turbine. The pitch system 32 comprises a pitch bearing (not shown in the figure) including a first bearing ring connected to a hub of the wind turbine, and a second bearing ring connected to the blade, wherein the first bearing ring is rotatable with respect to the second bearing ring.

More particularly, FIG. 3 shows a pitch drive 68 comprising a motor 74, a gearbox 76, a main brake 75 and a pinion 78 to engage with an annular gear 79. The pitch system 32 further comprises an auxiliary brake system. The auxiliary brake system includes an auxiliary brake 95 and an auxiliary pinion 98 to engage with the annular gear 79, wherein the auxiliary brake 95 is configured to switch between an active state, wherein braking forces are applied to the annular gear 79 to maintain the blade in an instantaneous position, and an inactive state. In the inactive state no or substantially no braking forces are applied to the annular gear 79 by the auxiliary brake 95. A default state of the auxiliary brake is the inactive state.

The pitch drive 68 may generally also comprise a motor controller arranged with the pitch motor 74. Such a motor controller may be e.g. a variable frequency drive or any suitable converter system for controlling operation of the motor.

The annular gear 79 may generally be provided on one of the bearing rings, e.g. at an inside surface of a bearing ring. In examples, the annular gear may be provided at an inside surface of a bearing ring connected to the blade. The pitch motor and gearbox may be mounted in the hub in these examples. Other arrangements, in which the position of pitch motor is inside the blade, and/or in which the annular gear is provided radially at an outside of one the bearing rings are also possible.

During normal operation, suitable pitch angles may be determined by a control system. The control system may be a central control system of the wind turbine, or part thereof, or may be a dedicated pitch control system. Based e.g. on wind speed, or on the rotational speed of the rotor, or other parameters (e.g. loads) a suitable pitch angle for the blade may be determined. The pitch motor may drive the pinion through use of the pitch gearbox. The pitch gearbox may be configured to convert a relatively quick rotation of the pitch motor with a relatively low torque into a slower rotation with a higher torque.

In the pitch system 32, the main brake 75 of the pitch drive 68 may apply a braking force which may be transmitted to the annular gear 79 such that the annular gear is prevented from changing position. The wind turbine blade is thus maintained in its position. In other words it is blocked from rotating further around its longitudinal axis. Maintaining the position of the blade, or blocking of the blade may herein be regarded as substantially avoiding rotation of the blade. Due to e.g. manufacturing tolerances and a certain clearance between the teeth of the pinion and the annular gear, insignificant rotations or very small oscillations around its longitudinal axis might still be possible.

In some examples, the brake may include caliper(s) and a brake disc.

In the example shown in FIG. 3, the main brake 75 may apply a braking force to the gearbox 76, preventing the gearbox from moving and therefore, transmitting a braking force to the annular gear. By providing the main brake 75 at the input side of the gearbox 76 (reduction gearing 76), the torque applied by the main brake is multiplied by the gearbox 76. In other examples, the main brake 75 of the pitch drive 68 may be coupled anywhere within the pitch drive 68 that may allow prevention of movement of the annular gear 79.

As shown in FIG. 3, the auxiliary brake 95 may be coupled to an auxiliary gearbox 96 which in turn may be coupled to an auxiliary pinion 98. The auxiliary pinion 98 may also be coupled to the annular gear 79. In normal operation, the auxiliary brake 95 is in an inactive state, i.e the default state of the auxiliary brake is the inactive state, such that the position of the annular gear 79 is only determined by the pitch drive 68, and such that the annular gear 79 may drag the auxiliary pinion 98 and the auxiliary gearbox 96. I.e. the auxiliary pinion is free to rotate and may be rotated by the annular gear. This configuration may provide an auxiliary or emergency brake which does not affect the annular gear in normal operation of the wind turbine and which may be used as a backup brake only when it may be needed.

When the auxiliary brake is activated, the auxiliary pinion may be substantially blocked from further rotation. Since the auxiliary pinion 98 meshes with the annular gear, the annular gear also cannot rotate.

An aspect of using a gearbox between the auxiliary brake and pinion is that the torque applied to the brake may be relatively low. In other examples, the auxiliary brake 95 does not include an auxiliary gearbox 96. The torque applied by the auxiliary brake 95 may be higher, but the risk of a failure in the auxiliary gearbox is avoided.

During operation of the wind turbine, there may be some circumstances in which it may be necessary to activate a main brake 75 in the pitch drive 68 so that a blade is stopped from moving relative to the hub. However, a fault in the pitch drive 68 may prevent this from happening. The auxiliary brake 95 may be configured to be switched to the active state when a fault is detected in the pitch drive 68. In some examples, the state of the auxiliary brake may be switched by a control system 80.

A fault in the pitch drive can have a consequence that the pitch drive is not able to apply a braking force to the annular gear, and therefore movement of the blade relative to the hub may not be prevented. In some examples, a fault in the pitch drive may be a fault in the main brake. In other examples, a fault in the pitch drive may be a fault in any of the components of the pitch drive which may be involved in the process of applying a braking force to the annular gear e.g. the gearbox of the pitch drive or the motor axis.

In the example of FIG. 3, the auxiliary brake 95 is not operatively connected to any auxiliary drive or drive mechanism e.g. a motor for driving the auxiliary pinion. This provides a simple and reliable backup brake for the pitch system while additional costs may be avoided. It also avoids the need for a coordinated control of two motors or other drive mechanisms.

The auxiliary brake may be coupled to the auxiliary gearbox and may also be in connection with a control system, which may switch the state of the auxiliary brake from an inactive state to an active state only upon detection of a fault in the pitch drive.

In an active state, the auxiliary brake 95 may impart a braking torque to the auxiliary gearbox 96 which may transmit the braking torque to the auxiliary pinion 98, preventing a rotation of the auxiliary pinion 98 and leading to a braking torque being applied to the annular gear 79.

Further, a monitoring system may be configured to monitor braking forces applied to the annular gear 79. Thereby, the monitoring system may enable the detection of a fault in the pitch drive 68. In some examples, the monitoring system may comprise at least a first position sensor 93 which may be configured to provide information about the position of the annular gear 79. When a braking force is applied by the main brake of the pitch drive 68, the annular gear 79 should be prevented from moving. The monitoring system may detect a constant position of the annular gear, thus giving information that the pitch drive 68 and main brake is functioning as required.

On the other hand, if a rotation of the annular gear is detected in spite of the main brake being active, a fault is detected, and the auxiliary brake may be switched to its active state.

In examples, detecting a fault may comprises determining a position of an annular gear with two independent systems.

In some examples, a monitoring system for detecting faults or a control system may comprise a first position sensor 93 and a second position sensor 73. In particular, the pitch system 32 may comprise a first position sensor 93 arranged with the annular gear and the pitch drive 68 may comprise a second position sensor 73. The first and second position sensors 93, 73 may be in communication with a control system 80 and may provide information which may be used to detect a fault in the pitch drive. In some examples the first position sensor 93 may be a resolver and the second position sensor 73 may be an encoder of the pitch motor.

The first and second position sensors 93, 73 may be configured to emit redundant signals containing information relating to the position of the annular gear 79. When all the components of the pitch drive 68 function in a correct manner, the first and second position sensors 93, 73 will emit corresponding signals regarding the position of the annular gear 79, or regarding the rotation of the annular gear and therefore the movement of the blade relative to the hub. This may ensure that the pitch system is properly monitored.

In case of a failure in the pitch drive 68, e.g. damage in the gearbox, in the motor, the controller of the motor or in the pinion of the pitch drive, the second position sensor 73 of the pitch drive may emit a position signal that is in conflict with the position determined by the first position sensor 93.

Different signals from the first and second position sensors 93, 73 may indicate a fault in the pitch system. The auxiliary brake 95 may be configured to switch to an active state when there are discrepancies between the first and second position sensors 93, 73 of the monitoring system. Thereby, the auxiliary brake may act as an emergency brake, which may be activated when a failure in the pitch drive is detected.

As shown in FIG. 3, the auxiliary brake 95 may be coupled to a control system 80 which may be configured to switch the state of the auxiliary brake. The control system 80 may be in communication with the monitoring system comprising a first and second position sensors 93, 73. When a fault is detected in the pitch drive 68, the control system 80 may be configured to switch the state of the auxiliary brake 95 to an active state. The pitch movement of the blade may then be stopped.

A fault in the pitch drive may lead to an uncontrolled movement of the blade relative to the hub. In some examples, the auxiliary brake may comprise a centrifugal brake. The centrifugal brake may be configured to switch to an active state when the rotation of the annular gear reaches a predetermined velocity. I.e. if a pitch drive system fails and the blade is loose, a relatively rapid rotation of the blade around its longitudinal axis may occur. If the velocity reaches a specific threshold, the centrifugal brake will automatically engage and exert a braking force. The braking force will disappear when the blade's rotational speed is reduced.

Figure 4:
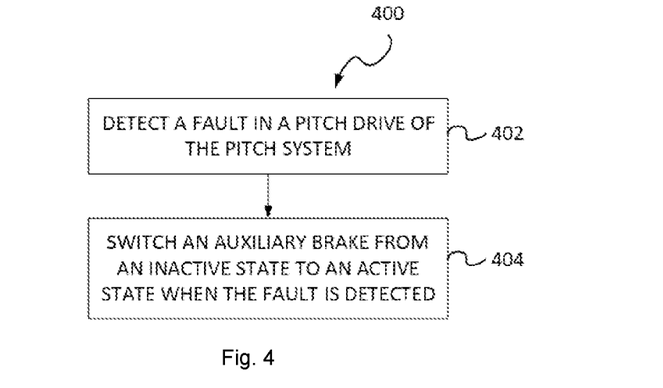
FIG. 4 shows a flowchart of an example of a method for applying an emergency pitch braking torque to a pitch system of a blade of a wind turbine.

In another aspect of the disclosure, a method 400 is disclosed. FIG. 4 is a flow chart of an example of a method 400 for applying an emergency pitch braking torque to a pitch system of a blade of a wind turbine.

As shown in FIG. 4, method 400 includes, at block 402, detecting a fault in a pitch drive of the pitch system, where the pitch drive includes a motor, a gearbox, a main brake and a pinion engaged with an annular gear of the pitch system. Further, the method comprises, at block 404, switching an auxiliary brake from an inactive state to an active state when the fault is detected. In the active state the auxiliary brake blocks an auxiliary pinion engaged with the annular gear in order to apply braking forces to the annular gear to maintain the blade in an instantaneous position.

The method 400 provides a simple and reliable way of ensuring that a braking force may be applied to an annular gear of a pitch system. The method 400 prevents uncontrolled movement of a blade relative to a hub of a wind turbine from happening.

The auxiliary brake may be coupled to an auxiliary gearbox, which may be coupled to an auxiliary pinion. In turn, the auxiliary pinion may be coupled to the annular gear of the pitch system. In an inactive state, the auxiliary brake may not influence the movement of the annular gear of the pitch system.

However, when the auxiliary brake is switched from an inactive state to an active state, the auxiliary brake may apply braking forces to the auxiliary gearbox, which may transmit these forces to the auxiliary pinion, which may prevent the annular gear from moving. Therefore, movement of the blade relative to the hub may be prevented.

The auxiliary brake may not be operatively connected to any drive mechanism, such as e.g., a motor. Therefore, a simple auxiliary brake may be provided with which a braking force may be applied to the annular gear regardless of the pitch angle of the wind turbine blade. The use of additional components in the auxiliary brake may be reduced providing a non-complex and reliable pitch system.

In some examples, detecting a fault comprises detecting a failure in applying a braking force to the annular gear. A monitoring system may be configured to monitor braking forces applied to the annular gear and the fault may be detected by a control system, which may switch the auxiliary brake from an inactive state to an active state, as described above.

In examples, detecting a fault may comprise determining a position of the annular gear with two independent (sensor) systems.

In examples, the wind turbine comprises two further blades, and the method may be carried out during a shutdown procedure wherein the two further blades are pitched towards a feathered position. It has been found that in such a scenario a loose blade can lead to very high loads which may even constitute a critical load case.

In a further aspect, a wind turbine comprising a pitch system for a blade of the wind turbine is disclosed. The pitch system comprises a pitch bearing having a first bearing ring connected to a hub of the wind turbine, and a second bearing ring connected to the blade, where the first bearing ring is rotatable with respect to the second bearing ring. The pitch system also includes an annular gear. The system furthermore includes a pitch drive having a motor, a gearbox, a main brake, and a pinion to engage with the annular gear. In addition, the pitch system includes an auxiliary brake system having an auxiliary brake and an auxiliary pinion to engage with the annular gear, wherein the auxiliary brake is configured to switch between an active state, where braking forces are applied to the annular gear, or in an inactive state, where substantially no braking forces are applied to the annular gear, and wherein a default state of the auxiliary brake is the inactive state.

The wind turbine may comprise a pitch system according to any of the examples disclosed throughout the present disclosure. In some examples, the wind turbine may comprise the pitch system in at least one of its blades. In other examples, the wind turbine may comprise the pitch system in all of its blades.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A pitch system for a blade of a wind turbine, comprising:
   a pitch bearing comprising a first bearing ring connected to a hub of the wind turbine, and a second bearing ring connected to the blade, wherein the first bearing ring is rotatable with respect to the second bearing ring;
   an annular gear;
   a pitch drive comprising a motor, a gearbox, a main brake, and a pinion that engages with the annular gear;
   an auxiliary brake system comprising an auxiliary brake, and an auxiliary pinion that engages with the annular gear, wherein the auxiliary brake is configured to switch between an active state and an inactive state when a fault is detected in the pitch drive;
   wherein in the active state of the auxiliary brake, braking forces are applied to the annular gear to maintain the blade in an instantaneous position, and in an inactive state of the auxiliary brake, substantially no braking forces are applied to the annular gear;
   wherein the inactive state of the auxiliary brake is a default state of the auxiliary brake; and
   wherein the auxiliary brake is unconnected to a motor or other type of drive that drives the auxiliary pinion.

2. The pitch system of claim 1, wherein the fault comprises a fault in the main brake.

3. The pitch system of claim 1, further comprising an auxiliary gearbox operatively connected between the auxiliary brake and the auxiliary pinion.

4. The pitch system of claim 1, further comprising a monitoring system configured to monitor braking forces applied to the annular gear.

5. The pitch system of claim 4, wherein the monitoring system comprises a first position sensor configured to provide information of a position or movement of the annular gear.

6. The pitch system of claim 1, further comprising a control system in communication with the auxiliary brake, the control system configured to switch the auxiliary brake to the active state.

7. The pitch system of claim 6, further comprising a first position sensor arranged with the annular gear, the pitch drive comprising a second position sensor, and wherein the first and second position sensors are in communication with the control system.

8. The pitch system of claim 7, wherein the first and second position sensors are configured to emit redundant signals relative to a position or a movement of the annular gear, and wherein the control system is configured to switch the auxiliary brake to the active state when signals emitted by the first and second position sensors are in conflict with each other.

9. The pitch system of claim 1, wherein the auxiliary brake comprises a centrifugal brake configured to switch to the active state when the annular gear reaches a predetermined velocity.

10. A wind turbine, comprising the pitch system for a blade of the wind turbine according to claim 1.

11. A method for applying an emergency braking torque to a pitch system of a blade of a wind turbine, the pitch system including a pitch drive, the pitch drive including a motor, a gearbox, a main brake, and a pinion engaged with an annular gear of the pitch system, the method comprising:
   detecting a fault in the pitch drive;
   switching an auxiliary brake from an inactive state to an active state when the fault is detected;
   wherein in the active state, the auxiliary brake blocks an auxiliary pinion engaged with the annular gear in order to apply braking forces to the annular gear to maintain the blade in an instantaneous position; and
   wherein the auxiliary brake is unconnected to a motor or other type of drive that drives the auxiliary pinion.

12. The method of claim 11, wherein detecting a fault in the pitch drive comprises detecting a failure in applying a braking force to the annular gear.

* * * * *